(12) United States Patent
Didier

(10) Patent No.: US 9,630,877 B2
(45) Date of Patent: Apr. 25, 2017

(54) SIZING COMPOSITION FOR FIBERS, IN PARTICULAR MINERAL FIBERS, BASED ON HUMIC AND/OR FULVIC ACID, AND RESULTING INSULATING PRODUCTS

(71) Applicant: SAINT-GOBAIN ISOVER, Courbevoie (FR)

(72) Inventor: Benoit Didier, Courbevoie (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 463 days.

(21) Appl. No.: 14/372,579

(22) PCT Filed: Jan. 17, 2013

(86) PCT No.: PCT/FR2013/050109
§ 371 (c)(1),
(2) Date: Jul. 16, 2014

(87) PCT Pub. No.: WO2013/107990
PCT Pub. Date: Jul. 25, 2013

(65) Prior Publication Data
US 2014/0353539 A1 Dec. 4, 2014

(30) Foreign Application Priority Data

Jan. 17, 2012 (FR) .................................... 12 50463

(51) Int. Cl.
| | | |
|---|---|---|
| *C03C 25/00* | (2006.01) | |
| *C03C 25/32* | (2006.01) | |
| *C09J 105/00* | (2006.01) | |
| *D04H 1/587* | (2012.01) | |
| *C03C 3/091* | (2006.01) | |
| *C03C 3/097* | (2006.01) | |
| *C03C 13/06* | (2006.01) | |
| *C03C 25/26* | (2006.01) | |
| *D04H 1/4209* | (2012.01) | |
| *C03C 25/42* | (2006.01) | |
| *E04B 1/76* | (2006.01) | |

(52) U.S. Cl.
CPC .............. *C03C 25/32* (2013.01); *C03C 3/091* (2013.01); *C03C 3/097* (2013.01); *C03C 13/06* (2013.01); *C03C 25/002* (2013.01); *C03C 25/26* (2013.01); *C03C 25/42* (2013.01); *C09J 105/00* (2013.01); *D04H 1/4209* (2013.01); *D04H 1/587* (2013.01); *E04B 1/7658* (2013.01)

(58) Field of Classification Search
CPC ......... C03C 3/091; C03C 3/097; C03C 13/06; C03C 25/002; C03C 25/26; C03C 25/32; C03C 25/42; D04H 1/4209; D04H 1/587; E04B 1/7658; C09J 105/00
See application file for complete search history.

(56) References Cited

U.S. PATENT DOCUMENTS

| | | |
|---|---|---|
| 5,318,990 A | 6/1994 | Strauss |
| 5,340,868 A | 8/1994 | Strauss et al. |
| 5,661,213 A | 8/1997 | Arkens et al. |
| 5,895,804 A | 4/1999 | Lee et al. |
| 5,932,689 A | 8/1999 | Arkens et al. |
| 5,977,232 A | 11/1999 | Arkens et al. |
| 6,071,994 A | 6/2000 | Hummerich et al. |
| 6,099,773 A | 8/2000 | Reck et al. |
| 6,146,746 A | 11/2000 | Reck et al. |
| 6,299,936 B1 | 10/2001 | Reck et al. |
| 6,331,350 B1 | 12/2001 | Taylor et al. |
| 8,691,106 B2 * | 4/2014 | Didier .................... C03C 13/00 252/62 |
| 9,193,894 B2 * | 11/2015 | Williamson ........... C09J 167/06 |
| 2002/0188055 A1 | 12/2002 | Chen et al. |
| 2003/0008978 A1 | 1/2003 | Chen et al. |
| 2004/0002567 A1 | 1/2004 | Chen et al. |
| 2005/0215153 A1 | 9/2005 | Cossement et al. |
| 2007/0027283 A1 | 2/2007 | Swift et al. |
| 2014/0353539 A1 * | 12/2014 | Didier .................... C03C 3/091 252/62 |

FOREIGN PATENT DOCUMENTS

| | | |
|---|---|---|
| FR | 2 935 707 | 3/2010 |
| FR | 2 940 648 | 7/2010 |
| GB | 2 451 719 | 2/2009 |
| JP | 59-116153 | 7/1984 |
| SU | 438 673 | 8/1974 |
| WO | WO 96/14274 | 5/1996 |
| WO | WO 99/56525 | 11/1999 |
| WO | WO 99/57073 | 11/1999 |
| WO | WO 00/17117 | 3/2000 |
| WO | WO 01/96254 | 12/2001 |
| WO | WO 2005/033032 | 4/2005 |
| WO | WO 2006/103376 | 10/2006 |
| WO | WO 2007/031625 | 3/2007 |
| WO | WO 2008/043960 | 4/2008 |
| WO | WO 2009/080938 | 7/2009 |
| WO | WO 2011/045531 | 4/2011 |

OTHER PUBLICATIONS

International Search Report issued for International Application No. PCT/FR2013/050109, dated Mar. 11, 2013.

\* cited by examiner

*Primary Examiner* — David M Brunsman

(74) *Attorney, Agent, or Firm* — Pillsbury Winthrop Shaw Pittman LLP

(57) ABSTRACT

A formaldehyde-free sizing composition for products based on fibers, in particular mineral fibers, such as glass or rock fibers, which includes at least one humic acid and/or one fulvic acid or a salt of these acids, at least one saccharide, and at least one inorganic acid ammonium salt.

21 Claims, 1 Drawing Sheet

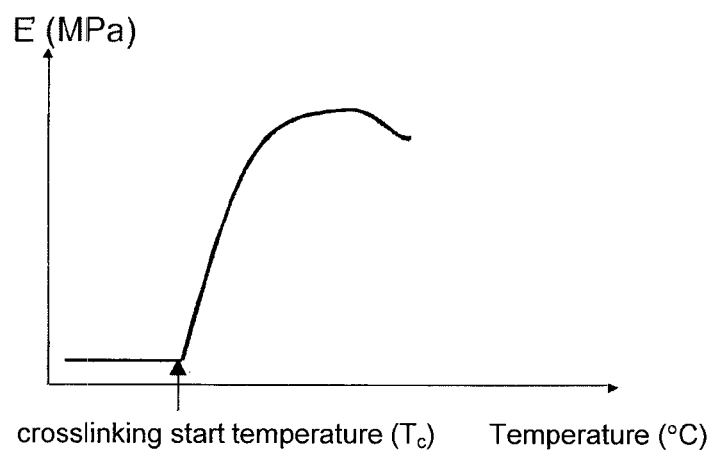

SIZING COMPOSITION FOR FIBERS, IN PARTICULAR MINERAL FIBERS, BASED ON HUMIC AND/OR FULVIC ACID, AND RESULTING INSULATING PRODUCTS

CROSS-REFERENCE TO RELATED APPLICATIONS

This application is a 371 filing of PCT/FR2013/050109, filed Jan. 17, 2013, which in turn claims priority to French Application No. 1250463, filed Jan. 17, 2012. The contents of all of these applications are incorporated herein by reference in their entirety.

The present invention relates to the field of products based on fibers, in particular of mineral fibers, bonded by a formaldehyde-free binder.

Although the invention very particularly describes thermal and/or acoustic insulating products, the fibers of which are in the form of mineral wool, in particular of glass or of rock, it does not, however, exclude other fiber-based products, in particular veils, mats, felts and woven materials.

A subject matter of the invention is thus a sizing composition capable of crosslinking to form a binder, which includes at least one humic and/or fulvic acid, at least one saccharide and at least one inorganic acid ammonium salt, the process for the manufacture of fiber-based products and the products which result therefrom, in particular thermal and/or acoustic insulating materials.

The manufacture of insulating products based on mineral wool generally comprises a stage of manufacture of the wool itself, which can be carried out by various processes, for example according to the known technique of fiberizing by internal or external centrifugation.

Internal centrifugation consists in introducing the molten material (generally glass or a rock) into a centrifugal device comprising a multitude of small orifices, the material being projected toward the peripheral wall of the device under the action of the centrifugal force and escaping therefrom in the form of filaments. On leaving the centrifugal device, the filaments are drawn and carried toward a receiving member by a gas stream having a high temperature and a high speed, in order to form a web of fibers (or mineral wool).

External centrifugation consists, for its part, in pouring out the molten material at the external peripheral surface of rotating members, known as rotors, from where said material is ejected under the action of the centrifugal force. Means for drawing by gas stream and for collecting on a receiving member are also provided.

In order to provide for the assembly of the fibers together and to make it possible for the web to have cohesion, a sizing composition comprising a thermosetting resin is applied to the fibers, on the route between the outlet of the centrifugal device and the receiving member. The web of fibers coated with the size is subjected to a heat treatment, at a temperature generally of greater than 100° C., in order to bring about the polycondensation of the resin and to thus obtain a thermal and/or acoustic insulating product having specific properties, in particular dimensional stability, tensile strength, thickness recovery after compression and homogeneous color.

The sizing composition to be projected onto the mineral wool is generally provided in the form of an aqueous solution including the thermosetting resin and additives, such as a catalyst for the crosslinking of the resin, an adhesion-promoting silane, a dust-preventing mineral oil, and the like. The sizing composition is generally applied to the fibers by spraying.

The properties of the sizing composition depend largely on the characteristics of the resin. From the viewpoint of the application, it is necessary for the sizing composition to exhibit good sprayability and to be able to be deposited at the surface of the fibers in order to efficiently bind them.

The resin has to be stable for a given period of time before being used to form the sizing composition, which composition is generally prepared at the time of use by mixing the resin and the additives mentioned above.

At the regulatory level, it is necessary for the resin to be regarded as non-polluting, that is to say for it to comprise—and for it to generate during the sizing stage or subsequently—as little as possible in the way of compounds which may be harmful to human health or to the environment.

The thermosetting resins most commonly used are phenolic resins belonging to the family of the resols. In addition to their good crosslinkability under the abovementioned thermal conditions, these resins are soluble in water, have a good affinity for mineral fibers, in particular glass fibers, and are relatively inexpensive.

These resols are obtained by condensation of phenol and formaldehyde, in the presence of a basic catalyst, in a formaldehyde/phenol molar ratio of greater than 1, so as to promote the reaction between the phenol and the formaldehyde and to reduce the level of residual phenol in the resin. The condensation reaction between the phenol and the formaldehyde is carried out while limiting the degree of condensation of the monomers, in order to avoid the formation of long, relatively water-insoluble, chains which reduce the dilutability. Consequently, the resin comprises a certain proportion of unreacted monomer, in particular formaldehyde, the presence of which is undesirable because of its known harmful effects.

For this reason, resol-based resins are generally treated with urea, which reacts with the free formaldehyde by trapping it in the form of nonvolatile urea-formaldehyde condensates. The presence of urea in the resin in addition brings a certain economic advantage as a result of its low cost because it is possible to introduce it in a relatively large amount without affecting the operating qualities of the resin, in particular without harming the mechanical properties of the final product, which significantly lowers the total cost of the resin.

Nevertheless, it has been observed that, under the temperature conditions to which the web is subjected in order to obtain crosslinking of the resin, the urea-formaldehyde condensates are not stable; they decompose with restoration of the formaldehyde and urea (in its turn at least partially decomposed to give ammonia), which are released into the atmosphere of the factory.

Regulations with regard to environmental protection, which are becoming more restrictive, are forcing manufacturers of insulating products to look for solutions which make it possible to further lower the levels of undesirable emissions, in particular of formaldehyde.

Solutions in which resols are replaced in sizing compositions are known.

A first solution is based on the use of a carboxylic acid polymer, in particular an acrylic acid polymer.

In U.S. Pat. No. 5,340,868, the size comprises a polycarboxylic polymer, a β-hydroxyamide and an at least trifunctional monomeric carboxylic acid.

Other sizing compositions have been provided which comprise a polycarboxylic polymer, a polyol and a catalyst, this catalyst being able to be a phosphorus-comprising compound (U.S. Pat. Nos. 5,318,990, 5,661,213, 6,331,350, US 2003/0008978), a fluoroborate (U.S. Pat. No. 5,977,232) or else a cyanamide, a dicyanamide or a cyanoguanidine (U.S. Pat. No. 5,932,689).

The sizing compositions based on a polycarboxylic polymer and on a polyol can additionally comprise a cationic, amphoteric or nonionic surfactant (US 2002/0188055), a coupling agent of silane type (US 2004/0002567) or a dextrin as cobinder (US 2005/0215153).

A description has also been given of sizing compositions comprising an alkanolamine including at least two hydroxyl groups and a polycarboxylic polymer (U.S. Pat. Nos. 6,071, 994, 6,099,773, 6,146,746) in combination with a copolymer (U.S. Pat. No. 6,299,936).

A second solution in which resols are replaced is based on the combination of a saccharide and another compound.

The other compound can be a polycarboxylic acid.

In U.S. Pat. No. 5,895,804, a description is given of an adhesive composition based on heat-crosslinkable polysaccharides which can be used as size for mineral wool. The composition includes a polycarboxylic polymer having at least two carboxylic acid functional groups and a molecular weight at least equal to 1000, and a polysaccharide having a molecular weight at least equal to 10 000.

In WO 2009/080938, the sizing composition comprises a monosaccharide and/or a polysaccharide and an organic polycarboxylic acid with a molar mass of less than 1000.

A formaldehyde-free aqueous sizing composition which comprises a Maillard reaction product, in particular combining a reducing sugar, a carboxylic acid and aqueous ammonia (WO 2007/014236), is also known. In WO 2009/019232 and WO 2009/019235, the proposal is made to substitute, for the carboxylic acid, an acid precursor derived from an inorganic salt, in particular an ammonium salt, which exhibits the additional advantage of being able to replace all or part of the aqueous ammonia.

The other compound can also be a polyfunctional crosslinking agent which is combined with a hydrogenated sugar (WO 2010/029266).

In WO 2011/045531, the other compound is an inorganic acid metal salt and the saccharide is a reducing sugar.

There exists a need to have available alternative formaldehyde-free sizing compositions which make it possible to manufacture acoustic and/or thermal insulating products from mineral fibers of any nature, in particular glass fibers, which tolerate with difficulty sizing compositions having an acidic nature as the latter result in corrosion of the glass.

An aim of the present invention is to provide a sizing composition for fibers, especially in the form of mineral wool, of glass or of rock, which overcomes the abovementioned disadvantages.

The sizing composition in accordance with the invention comprises:
  at least one humic acid and/or one fulvic acid or a salt of these acids,
  at least one saccharide, and
  at least one inorganic acid ammonium salt.

Humic acids and fulvic acids are complex acids which are present in humic substances in general, whether organic, such as peat or compost, or mineraloid and mineral, such as coal and lignite, in particular leonardite.

Humic and fulvic acids are generally extracted from the abovementioned humic substances by a process including a treatment with a strong base, such as sodium hydroxide or potassium hydroxide, which makes it possible to dissolve the two acids, followed by a treatment employing a strong acid, which results in the precipitation of the humic acids and the maintenance of the fulvic acids in solution in the acid. Such a process for obtaining these acids is described, for example, in WO 2009/065018.

The humic and fulvic acids can also be obtained from an artificial humic composition produced from lignocellulose materials (wood, corn stems and cobs, cereal straw, and the like) according to a mixed treatment process including thermal and mechanical stages (WO 2007/031625).

Humic acids have a molar mass of the order of 300 000 g/mol which is higher than that of fulvic acids, which is of the order of 2000 g/mol. Humic and fulvic acids are composed of aromatic nuclei carrying phenolic and carboxylic substituents, and also alcohol, aldehyde and ketone functional groups. Due to their molecular chain length and their numerous reactive functional groups, these acids are advantageous raw materials as starting point for an adhesive system resulting from renewable resources.

The humic and fulvic acids produced commercially are generally in the form of sodium, potassium and optionally ammonium salts. The salts of these acids (humates and fulvates) are soluble in water.

The saccharide in accordance with the present invention is a monosaccharide or an oligosaccharide.

The term "oligosaccharide" is understood to mean any type of saccharide, reducing or nonreducing, including at most 50 saccharide units. Preferably, the number of saccharide units is at most equal to 20, advantageously at most equal to 10, in order for the final sizing composition to exhibit a viscosity which is not excessively high, allowing it to be applied correctly to the mineral fibers.

The saccharide can thus be chosen from monosaccharides, such as glucose, galactose and mannose, disaccharides, such as fructose, lactose, maltose, isomaltose, cellobiose, trehalose, isotrehaloses, sucrose and isosucroses, trisaccharides, such as melezitose, gentianose, raffinose, erlose and umbelliferose, tetrasaccharides, such as stachyose, and pentasaccharides, such as verbascose. Glucose, sucrose and fructose are preferred.

The saccharide is present in the sizing composition in a proportion of 10 to 95 parts by weight per 100 parts by weight of the mixture of humic and/or fulvic acid or of the salts of this(these) acid(s), preferably of 20 to 90 parts and advantageously of 30 to 80 parts.

The inorganic acid ammonium salt, under the effect of the heat, at least partially dehydrates the saccharide, which reacts with the humic and/or fulvic acid or its salts to form of a polymeric network which constitutes the final binder. The polymeric network thus formed makes it possible to establish bonds between the mineral fibers, in particular at the junction points of the fibers in the mineral wool, which confers a degree of "elasticity" on the final product capable of providing good thickness recovery after unpacking the product.

The inorganic acid ammonium salt is chosen from ammonium sulfates, in particular ammonium hydrogensulfate $NH_4HSO_4$ and ammonium sulfate $(NH_4)_2SO_4$, ammonium phosphates, in particular monoammonium phosphate $NH_4H_2PO_4$, diammonium phosphate $(NH_4)_2HPO_4$ and ammonium phosphate $(NH_4)_3PO_4$, ammonium nitrates and ammonium carbonates, in particular ammonium bicarbonate $NH_4HCO_3$ and ammonium carbonate $(NH_4)_2CO_3$.

The inorganic acid ammonium salt is preferably chosen from sulfates and phosphates, advantageously sulfates.

In the sizing composition, the inorganic acid ammonium salt represents from 1 to 30% by weight of the total weight of the mixture consisting of humic and/or fulvic acid or the salt(s) of this(these) acid(s) and the saccharide, preferably from 3 to 20%, advantageously from 3 to 16% and better still from 5 to 15%.

Advantageously, the sizing composition additionally comprises a plasticizing agent, for example urea.

The amount of urea can range up to 20% by weight of the total weight of the mixture consisting of the humic and/or fulvic acid or the salt(s) of this(these) acid(s) and the saccharide.

The sizing composition can comprise, in addition to the compounds mentioned, the conventional additives below in the following proportions, calculated on the basis of 100 parts by weight of a mixture consisting of the humic and/or fulvic acid or the salt(s) of this(these) acid(s) and the saccharide:

from 0 to 2 parts of silane, in particular of aminosilane,
from 0 to 20 parts of oil, preferably from 4 to 15 parts,
from 0 to 20 parts of urea, preferably from 0 to 10 parts,
from 0 to 5 parts of a silicone,
from 0 to 30 parts of an "extender".

The role of the additives is known and is briefly restated: the silane is an agent for coupling between the fibers and the binder, which also acts as antiaging agent; the oils are dust-preventing and hydrophobic agents; the urea acts as plasticizer and makes it possible to prevent pregelling of the sizing composition; the silicone is a hydrophobic agent having the role of reducing absorption of water by the product, in particular when it is an insulating product; the "extender" is an organic or inorganic filler, soluble or dispersible in the sizing composition, which makes it possible in particular to reduce the costs of the sizing composition.

The sizing composition exhibits a pH which varies according to the nature of the humic and/or fulvic acid or of the salts of this(these) acid(s) and of the inorganic acid ammonium salt used, generally from 7 to 9.

The sizing composition according to the invention is intended to be applied to fibers, in particular mineral fibers, for the purposes of manufacturing products, such as veils, mats, felts and any type of thermal and/or acoustic insulating product based on mineral wool, in particular of grass or of rock. The products incorporating mineral wool are particularly targeted by the present invention.

The fibers constituting the glass wool can be composed of a glass of any nature, in particular a glass having a high alumina content, in particular of the order of 15 to 30% by weight, which presents a low resistance to corrosion by acid compounds. Such a glass is, for example, described in WO 00/17117, which comprises the constituents below in the following proportions, expressed as percentages by weight:

| | |
|---|---|
| $SiO_2$ | 39-55%, preferably 40-52% |
| $Al_2O_3$ | 16-27%, preferably 16-25% |
| CaO | 3-35%, preferably 10-25% |
| MgO | 0-15%, preferably 0-10% |
| $Na_2O$ | 0-15%, preferably 6-12% |
| $K_2O$ | 0-15%, preferably 3-12% |
| $R_2O$ ($Na_2O + K_2O$) | 10-17%, preferably 12-17% |
| $P_2O_5$ | 0-3%, preferably 0-2% |
| $Fe_2O_3$ | 0-15% |
| $B_2O_3$ | 0-8%, preferably 0-4% |
| $TiO_2$ | 0-3%, | the MgO content being between 0 and 5% when the $R_2O$ content is less than or equal to 13.0%.

Advantageously, the glass has the composition described in WO 2005/033032, which comprises the constituents below in the following proportions (as % by weight):

| | |
|---|---|
| $SiO_2$ | 39-44%, preferably 40-43% |
| $Al_2O_3$ | 16-27%, preferably 16-26% |
| CaO | 6-20%, preferably 8-18% |
| MgO | 1-5%, preferably 1-4.9% |
| $Na_2O$ | 0-15%, preferably 2-12% |
| $K_2O$ | 0-15%, preferably 2-12% |
| $R_2O$ ($Na_2O + K_2O$) | 10-14.7%, preferably 10-13.5% |
| $P_2O_5$ | 0-3%, in particular 0-2% |
| $Fe_2O_3$ | 1.5-15%, in particular 3.2-8% |
| $B_2O_3$ | 0-2%, preferably 0-1% |
| $TiO_2$ | 0-2%, preferably 0.4-1%. |

Other glass compositions having a high alumina content intended for the manufacture of fibers are described in WO 99/57073, WO 99/56525 and WO 2006/103376.

Compositions of use in the preparation of rock fibers, also having a high alumina content, are described in particular in WO 96/14274, which preferably comprise the constituents below in the following proportions, expressed as percentages by weight:

| | |
|---|---|
| $SiO_2$ | 32-48% |
| $Al_2O_3$ | 10-30% |
| CaO | 10-30% |
| MgO | 2-20% |
| FeO | 2-15% |
| $Na_2O + K_2O$ | 0-12% |
| $TiO_2$ | 0-6% |
| Other elements | 0-15% |

Conventionally, the sizing composition is applied to the mineral fibers at the outlet of the fiberizing device and before they are collected on the receiving member in the form of a web of fibers which is subsequently treated at a temperature which makes possible the crosslinking of the size and the formation of an infusible binder. The crosslinking of the size according to the invention takes place at a temperature of the order of from 100 to 200° C., generally at a temperature comparable to that of a conventional formaldehyde-phenol resin, in particular of greater than or equal to 110° C., preferably of less than or equal to 170° C.

The products obtained by sizing the fibers, in particular mineral fibers, using the abovementioned sizing composition also constitute a subject matter of the present invention.

These products can be veils (also known as "nonwovens"), mats, felts or woven materials which are coated or impregnated, in particular based on mineral fibers, such as glass or rock fibers.

The veils of mineral fibers have a use in particular as surface coating for thermal and/or acoustic insulating products based on mineral wool or a foam.

As already mentioned, the acoustic and/or thermal insulating products composed of mineral wool are particularly targeted by the present invention.

These thermal and/or acoustic insulating products are generally provided in the form of a mat, a felt, panels, blocks, shells or other molded forms based on mineral wool, of glass or rock.

A further subject matter of the invention is a process for the manufacture of a thermal and/or acoustic insulating product based on mineral wool, according to which the mineral wool is manufactured, the sizing composition according to the invention is applied to said wool and said wool is treated at a temperature which makes possible the crosslinking of the size and the formation of an infusible binder, for example under the thermal conditions described above.

The sizing composition can be applied by any appropriate means, for example by projection, spraying, atomization, coating or impregnation and preferably by spraying.

The following examples make it possible to illustrate the invention without, however, limiting it.

In these examples, the following are measured:

the crosslinking start temperature ($T_C$) by the Dynamic Mechanical Analysis (DMA) method, which makes it possible to characterize the viscoelastic behavior of a polymeric material. The procedure is as follows: a sample of Whatman paper is impregnated with the sizing composition (content of organic solids of the order of 30%) and is then fixed horizontally between two jaws. An oscillating component equipped with a device for measuring the stress as a function of the strain applied is positioned on the upper face of the sample. The device makes it possible to calculate the modulus of elasticity E'. The sample is heated to a temperature varying from 20 to 250° C. at the rate of 4° C./min. The curve of variation in the modulus of elasticity E' (in MPa) as a function of the temperature (in ° C.) is plotted from the measurements, the general appearance of the curve being given in FIG. 1. The crosslinking start temperature ($T_c$) value, in ° C., is determined on the curve.

the tensile strength according to the standard ASTM C 686-71T on a sample cut out by stamping from the insulating product. The sample has the shape of a torus with a length of 122 mm, a width of 46 mm, a radius of curvature of the cut-out of the outer edge equal to 38 mm and a radius of curvature of the cut-out of the inner edge equal to 12.5 mm.

The sample is positioned between two cylindrical mandrels of a test machine, one of which is movable and is moved at a constant rate. The breaking force (in newtons) of the sample is measured and the tensile strength TS, defined by the ratio of the breaking force F to the weight of the sample, is calculated (in N/g).

The tensile strength is measured after manufacture (initial tensile strength) and after accelerated aging in an autoclave at a temperature of 105° C. under 100% relative humidity for 15 minutes (TS15).

the loss on ignition on subjecting the sample to a temperature of 500° C. until the weight of the sample no longer varies. The loss on ignition (in %) is calculated according to the formula: 100×(initial weight−weight after treatment)/initial weight.

EXAMPLES 1 TO 17

Sizing compositions are prepared which comprise the constituents appearing in table 1, the amounts being expressed as parts by weight.

These compositions are prepared by introducing the constituents into a vessel containing water with stirring until the constituents have completely dissolved.

The sizing compositions exhibit a solids content (dry extract) equal to 30%.

The crosslinking start temperature ($T_c$) of examples 1 to 17 is at most equal to 167° C., a temperature which remains compatible with the conditions for the manufacture of thermal and/or acoustic insulating products based on mineral wool.

The crosslinking start temperature is virtually identical, whatever the nature of the humic acid salt (K or Na) used (examples 2, 3, 5, 6 and 8 compared with examples 9, 10, 12, 13 and 15, respectively). Examples 16 and 17, comprising a humic acid and fulvic acid mixture, exhibit a crosslinking start temperature also comparable to the abovementioned examples.

Examples 2 and 9, which include ammonium sulfate, are preferred as they exhibit a lower crosslinking start temperature than that of examples 3 and 10, comprising diammonium phosphate.

EXAMPLES 18 TO 20

These examples illustrate the manufacture of insulating products on an industrial-scale line.

Use is made of the sizing compositions comprising the constituents appearing in table 2, in amounts expressed as parts by weight, to form products based on mineral wool exhibiting a nominal density equal to 10.6 kg/m³ and a nominal thickness equal to 144 mm. By way of comparison, use is also made of a sizing composition comprising a premix containing 80 parts by weight of a phenol-formaldehyde-monoethanolamine resin (example 1 of WO 2008/043960) and 20 parts by weight of urea, and the additives mentioned in table 2 (Reference 1).

Glass wool is manufactured on a pilot line by the internal centrifugation technique in which the molten glass composition is converted into fibers by means of a tool, referred to as centrifuging disk, comprising a basket forming a chamber for receiving the molten composition and a peripheral band pierced by a multitude of orifices: the disk is rotated about its vertically positioned axis of symmetry, the composition is ejected through the orifices under the effect of the centrifugal force and the material escaping from the orifices is drawn into fibers with the assistance of a drawing gas stream.

Conventionally, a size spraying ring is positioned beneath the fiberizing disk so as to uniformly distribute the sizing composition over the glass wool which has just been formed.

The mineral wool, thus sized, is collected on a belt conveyor equipped with internal extraction boxes which hold the mineral wool in the form of a web at the surface of the conveyor. The web is placed in an oven at 230° C. for 10 minutes.

The glass comprises the constituents below in the following proportions, expressed as % by weight:

| | |
|---|---|
| $SiO_2$ | 65.40 |
| $Al_2O_3$ | 2.05 |
| CaO | 8.05 |
| MgO | 2.55 |
| $Na_2O$ | 16.80 |
| $K_2O$ | 0.23 |
| $B_2O_3$ | 4.65 |
| Others ($Fe_2O_3$, $ZrO_2$, $Cr_2O_3$, $TiO_2$, MnO) | 0.27 |

The properties of the insulating products obtained are given in table 2.

EXAMPLES 21 TO 23

The procedure is carried out under the conditions of examples 18 to 20, modified in that use is made of the sizing compositions as defined in table 3 and of a glass having a high alumina content.

The sizing composition used by way of comparison (Reference 2) comprises a premix including 60 parts by weight of a phenol-formaldehyde resin (example 2 of WO 01/96254) and 40 parts by weight of urea, and the additives mentioned in table 3.

The glass comprises the constituents below in the following proportions, expressed as % by weight:

| | |
|---|---|
| $SiO_2$ | 41.50 |
| $Al_2O_3$ | 23.30 |
| CaO | 14.10 |
| MgO | 2.00 |
| BaO | 0.30 |
| SrO | 0.38 |
| $Na_2O$ | 5.50 |
| $K_2O$ | 5.40 |
| MnO | 0.20 |
| $Fe_2O_3$ | 5.35 |
| $TiO_2$ | 0.70 |
| $P_2O_5$ | 0.80 |

The mineral wool, thus sized, is collected on a belt conveyor equipped with internal extraction boxes which hold the mineral wool in the form of a felt or of a web at the surface of the conveyor. The conveyor subsequently moves through an oven maintained at 250° C., where the constituents of the size polymerize to form a binder. The product obtained has a nominal density equal to 17.5 kg/m³ and a nominal thickness equal to 75 mm.

The properties of the insulating products obtained are given in table 4.

TABLE 1

| Example | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Sizing composition | | | | | | | | | | | | | | | | | |
| Humin ®-P 775[1] | 40 | 40 | 40 | 50 | 40 | 20 | 80 | 20 | — | — | — | — | — | — | — | — | — |
| Humin ®-S 775 [2] | — | — | — | — | — | — | — | — | 40 | 40 | 50 | 40 | 20 | 40 | 20 | — | — |
| SHB Hydro Nectar[3] | — | — | — | — | — | — | — | — | — | — | — | — | — | — | — | 40 | 20 |
| Glucose | 60 | 60 | 60 | — | — | — | — | — | 60 | 60 | — | — | — | — | — | — | — |
| Sucrose | — | — | — | 50 | 60 | 80 | — | — | — | — | 50 | 60 | 80 | — | — | 60 | 80 |
| Fructose | — | — | — | — | — | — | 20 | 80 | — | — | — | — | — | 60 | 80 | — | — |
| Ammonium sulfate | 10 | 10 | — | 7.5 | 10 | — | 10 | 15 | 10 | — | 10 | 10 | — | 10 | 15 | 10 | 15 |
| Diammonium phosphate | — | — | 10 | — | — | 15 | — | — | — | 10 | — | — | 15 | — | — | — | — |
| Urea | — | 10 | 10 | — | 8 | 5 | 20 | 10 | 10 | 10 | 10 | 8 | 5 | 10 | 10 | 10 | 5 |
| Properties | | | | | | | | | | | | | | | | | |
| Crosslinking start temp. $T_C$ (° C.) | 130 | 132 | 144 | 150 | 160 | 156 | 156 | 131 | 126 | 145 | 162 | 167 | 163 | 144 | 135 | 153 | 146 |
| pH[4] | 8.2 | 8.2 | 8.4 | 8.4 | 8.6 | 8.3 | 8.4 | 7.3 | 8.7 | 8.7 | 9.0 | 8.6 | 8.6 | 8.0 | 7.6 | 8.5 | 8.3 |

[1]Sold by Humintech; Potassium humate; 100% water-soluble powder
[2] Sold by Humintech; Sodium humate; 100% water-soluble granules
[3]Sold by Boisvalor; mixture of humic acid (55% by weight) and fulvic acid (45% by weight); liquid
[4]solids content: 30%

The properties of the insulating products obtained are given in table 3.

EXAMPLES 24 AND 25

These examples illustrate the manufacture of insulating products on an industrial line.

Use is made of the sizing compositions comprising the constituents appearing in table 4, in amounts expressed as parts by weight, in order to form products based on mineral wool. By way of comparison, use is also made of a sizing composition comprising a premix including 80 parts by weight of a phenol-formaldehyde-monoethanolamine resin (example 1 of WO 2008/043960) and 20 parts by weight of urea, and the additives mentioned in table 4 (Reference 1).

Glass wool is manufactured on an industrial line with a width of 2.4 m by the internal centrifugation technique using a glass having the composition given in examples 18 to 20.

Conventionally, the molten glass composition is converted into fibers by means of a tool, referred to as centrifuging disk, comprising a basket forming a chamber for receiving the molten composition and a peripheral band pierced by a multitude of orifices: the disk is rotated about its vertically positioned axis of symmetry, the composition is ejected through the orifices under the effect of the centrifugal force and the material escaping from the orifices is drawn into fibers with the assistance of a drawing gas stream.

A size spraying ring is positioned beneath the fiberizing disk so as to uniformly distribute the sizing composition over the glass wool which has just been formed.

TABLE 2

| Example | 18 | 19 | 20 | Ref. 1 |
|---|---|---|---|---|
| Sizing composition | | | | |
| Humin ®-P 775[1] | 40 | — | — | — |
| Humin ®-S 775 [2] | — | 40 | 20 | — |
| Sucrose | 60 | 60 | 60 | — |
| Ammonium sulfate | 10 | 10 | 15 | — |
| Urea | 10 | — | 5 | — |
| γ-Aminopropyltriethoxysilane | 1 | 1 | 1 | 0.5 |
| Mineral oil | 9 | 9 | 9 | 9 |
| Properties of the product | | | | |
| Tensile strength (N/g) | | | | |
| Initial | 1.2 | 1.1 | 1.3 | 3.1 |
| After aging (TS15) | 1.3 | 1.2 | 1.5 | 2.9 |
| Loss on ignition (%) | 3.2 | 4.0 | 3.8 | 5.1 |

[1]Sold by Humintech; Potassium humate; 100% water-soluble powder
[2] Sold by Humintech; Sodium humate; 100% water-soluble granules

TABLE 3

| Example | 21 | 22 | 23 | Ref. 2 |
|---|---|---|---|---|
| Sizing composition | | | | |
| Humin ®-S 775 [2] | 10 | 10 | 10 | — |
| Sucrose | 90 | — | — | — |
| Glucose | — | 90 | — | — |
| Roclys ® C 3072 S[5] | — | — | 90 | — |
| Ammonium sulfate | 14 | 14 | 14 | — |
| Urea | 2 | 2 | 2 | — |
| γ-Aminopropyltriethoxysilane | 0.5 | 0.5 | 0.5 | 0.5 |

TABLE 3-continued

| Example | 21 | 22 | 23 | Ref. 2 |
|---|---|---|---|---|
| Mineral oil | 9 | 9 | 9 | 9 |
| Properties of the product | | | | |
| Tensile strength (N/g) | | | | |
| Initial | 1.6 | 2.1 | 1.1 | 3.3 |
| After aging (TS15) | 1.1 | 1.4 | 1.1 | 2.7 |
| Loss on ignition (%) | 4.5 | 3.7 | 5.0 | 4.5 |

[1] Sold by Humintech; Potassium humate; 100% water-soluble powder
[2] Sold by Humintech; Sodium humate; 100% water-soluble granules
[5] Sold by Roquette; corn starch dextrins; Dextrose equivalent (DE):

TABLE 4

| Example | 24 | 25 | Ref. 1 |
|---|---|---|---|
| Sizing composition | | | |
| SHB 105[6] | 22.7 | 11.6 | — |
| Sucrose | 77.3 | 88.4 | — |
| Ammonium sulfate | 13.6 | 15.6 | — |
| γ-Aminopropyltriethoxysilane | 0.5 | 0.5 | 0.5 |
| Mineral oil | 9.5 | 9.5 | 9.5 |
| Properties of the product | | | |
| Tensile strength (N/g) | | | |
| Initial | 2.8 | 3.5 | 4.5 |
| After aging (TS15) | 2.7 | 3.4 | 4.4 |
| Loss on ignition (%) | 4.4 | 5.0 | 4.4 |

[6] Sold by Boisvaloir; mixture of humic acid (55% by weight) and fulvic acid (45% by weight); liquid

The invention claimed is:

1. A formaldehyde-free sizing composition for fibers comprising:
    at least one humic acid and/or one fulvic acid or a salt of these acids,
    at least one saccharide, and
    at least one inorganic acid ammonium salt.

2. The composition as claimed in claim 1, wherein the at least one humic and/or fulvic acid is in the form of a potassium, sodium or ammonium salt.

3. The composition as claimed in claim 1, wherein the at least one saccharide is a monosaccharide or an oligosaccharide including at most 50 saccharide units.

4. The composition as claimed in claim 3, wherein the at least one saccharide is chosen from a monosaccharide, a disaccharide, a trisaccharide, a tetrasaccharide, and a pentasaccharide.

5. The composition as claimed in claim 4, wherein the monosaccharide is glucose, galactose or mannose, wherein the disaccharide is fructose, lactose, maltose, isomaltose, cellobiose, trehalose, isotrehalose, sucrose or isosucrose, wherein the trisaccharide is melezitose, gentianose, raffinose, erlose or umbelliferose, wherein the tetrasaccharide is stachyose, and wherein the pentasaccharide is verbascose.

6. The composition as claimed in claim 1, wherein the at least one saccharide is present in a proportion of 10 to 95 parts by weight per 100 parts by weight of the mixture of the at least one humic and/or fulvic acid or of the salts thereof.

7. The composition as claimed in claim 1, wherein the at least one inorganic acid ammonium salt is an ammonium sulfate, an ammonium phosphate, an ammonium nitrate or an ammonium carbonate.

8. The composition as claimed in claim 7, wherein the at least one inorganic acid ammonium salt is an ammonium sulfate.

9. The composition as claimed in claim 1, wherein the at least one inorganic acid ammonium salt represents from 1 to 30% by weight of the total weight of the mixture consisting of the at least one humic and/or fulvic acid or the salt thereof and the at least one saccharide.

10. The composition as claimed in claim 9, wherein the at least one inorganic acid ammonium salt represents from 3 to 20% by weight of the total weight of the mixture consisting of the at least one humic and/or fulvic acid or the salt thereof and the at least one saccharide.

11. The composition as claimed in claim 10, wherein the at least one inorganic acid ammonium salt represents from 3 to 16% by weight of the total weight of the mixture consisting of the at least one humic and/or fulvic acid or the salt thereof and the at least one saccharide.

12. The composition as claimed in claim 11, wherein the at least one inorganic acid ammonium salt represents from 5 to 15% by weight of the total weight of the mixture consisting of the at least one humic and/or fulvic acid or the salt thereof and the at least one saccharide.

13. The composition as claimed in claim 1, additionally comprising the additives below in the following proportions, calculated on the basis of 100 parts by weight of a mixture consisting of the at least one humic and/or fulvic acid or the salt thereof and the at least one saccharide:
    from 0 to 2 parts of silane,
    from 0 to 20 parts of oil,
    from 0 to 20 parts of urea,
    from 0 to 5 parts of a silicone,
    from 0 to 30 parts of an extender.

14. The composition as claimed in claim 1, wherein the composition exhibits a pH which varies from 7 to 9.

15. A product based on fibers sized using the sizing composition as claimed in claim 1.

16. The product as claimed in claim 15, wherein the product is a thermal and/or acoustic insulating product, the fibers of which are in the form of mineral wool.

17. The product as claimed in claim 16, wherein the fibers are composed of a glass which comprises the constituents below in the following proportions, expressed as percentages by weight:

| | |
|---|---|
| $SiO_2$ | 39-55% |
| $Al_2O_3$ | 16-27% |
| CaO | 3-35% |
| MgO | 0-15% |
| $Na_2O$ | 0-15% |
| $K_2O$ | 0-15% |
| $R_2O$ ($Na_2O + K_2O$) | 10-17% |
| $P_2O_5$ | 0-3% |
| $Fe_2O_3$ | 0-15% |
| $B_2O_3$ | 0-8% |
| $TiO_2$ | 0-3%, | the MgO content being between 0 and 5% when the $R_2O$ content is less than or equal to 13.0%.

18. The product as claimed in claim 17, wherein the glass comprises the constituents below in the following proportions (as % by weight):

| | |
|---|---|
| $SiO_2$ | 39-44% |
| $Al_2O_3$ | 16-27% |
| CaO | 6-20% |

-continued

| | |
|---|---|
| MgO | 1-5% |
| Na$_2$O | 0-15% |
| K$_2$O | 0-15% |
| R$_2$O (Na$_2$O + K$_2$O) | 10-14.7% |
| P$_2$O$_5$ | 0-3% |
| Fe$_2$O$_3$ | 1.5-15% |
| B$_2$O$_3$ | 0-2% |
| TiO$_2$ | 0-2%. |

19. A process for the manufacture of an acoustic and/or a thermal insulating product as claimed in claim 16, according to which the mineral wool is manufactured, the process comprising applying a sizing composition to said wool and treating said wool at a temperature which makes possible the crosslinking of the size and the formation of an infusible binder, wherein the sizing composition comprises
- at least one humic acid and/or one fulvic acid or a salt of these acids,
- at least one saccharide, and
- at least one inorganic acid ammonium salt.

20. The composition as claimed in claim 1, wherein the fibers are in the form of mineral wool.

21. The composition as claimed in claim 20, wherein the mineral wool is made from glass or rock.

* * * * *